United States Patent
Gaeddert et al.

(10) Patent No.: US 6,481,706 B1
(45) Date of Patent: Nov. 19, 2002

(54) MAGNETIC SHEET FANNER

(76) Inventors: Tom Gaeddert, 605 W. 13th, Newton, KS (US) 67114; Donald A. Suderman, 914 S. Hillside Rd., Newton, KS (US) 67114; Ryan S. Signer, 839 English Ct., Derby, KS (US) 67037

( * ) Notice: Subject to any disclaimer, the term of this patent is extended or adjusted under 35 U.S.C. 154(b) by 0 days.

(21) Appl. No.: 09/916,156

(22) Filed: Jul. 26, 2001

(51) Int. Cl.⁷ .................................................. B65H 3/16
(52) U.S. Cl. ...................... 271/18.1; 271/105; 271/901
(58) Field of Search .............................. 271/18.1, 18.2, 271/105, 901

(56) References Cited

U.S. PATENT DOCUMENTS

| | | | | |
|---|---|---|---|---|
| 2,847,212 A | * | 8/1958 | Stem | 271/18.1 |
| 2,860,874 A | * | 11/1958 | Gulick | 271/18.1 |
| 4,690,021 A | * | 9/1987 | Clark | 271/223 |
| 4,743,006 A | * | 5/1988 | Bolle et al. | 271/105 |
| 5,018,939 A | * | 5/1991 | Kishi et al. | 271/18.1 |
| 5,234,207 A | * | 8/1993 | Lindstrom et al. | 271/106 |
| 6,293,538 B1 | * | 9/2001 | Niedzielski et al. | 271/105 |

* cited by examiner

*Primary Examiner*—H. Grant Skaggs
(74) *Attorney, Agent, or Firm*—Kenneth H. Jack; Davis & Jack, L.L.C.

(57) ABSTRACT

A magnetic sheet fanner consisting of an elongated horseshoe magnet or bar magnet having an upper end and a lower end, the poles of such elongated magnet extending from the upper end to the lower end; a support frame having an interior space and having a sheet contact side; an axle and axle bearing assembly interlinking the elongated magnet and the support frame so that the elongated magnet may pivotally move between a first position "on" and a second "off" position within the interior space, the elongated magnet directing a magnetic field through the sheet contact side of the housing while the elongated magnet is in its first "on" position, the elongated magnet directing the magnetic field away from the sheet contact side upon pivotal motion to its second "off" position; and a pneumatic actuator adapted for selectively pivoting the elongated magnet between its first and second positions.

20 Claims, 11 Drawing Sheets

MAGNETIC SHEET FANNER

FIELD OF THE INVENTION

This invention relates to magnetic apparatus adapted for inducing magnetic fanning of steel sheets for purposes of efficient manual handling.

BACKGROUND OF THE INVENTION

Sheet steel is commonly stored in a stacked configuration upon a horizontally oriented work table or storage rack. Where, for example, rectangular sheets of one-eighth inch steel are stored in a stacked configuration, such sheets are commonly used in sequence from the top down. Where such sheets are neatly stacked one upon the other, the topmost sheet offers no surface which may be conveniently manually grasped to effectuate removal from the stack. Such stacked sheets of steel are often resistant to sliding, preventing a worker from exposing an edge over a side of the stack for grasping. Also, oil which is commonly disposed between such stacked sheets often results in cohesion creating further resistance to removal of a single sheet from the stack. Such cohesion effectively sticks together the sheets.

Stacks of sheet steel are known to become temporarily magnetized upon exposure to a magnetic field. Where the magnetic lines of flux from a magnetic field cross the striations of a stack of sheet steel, the individual sheets are magnetized in a manner causing their broad faces to form a series of magnetic poles. Where such magnetization occurs, consistent orientation of the magnetic poles causes opposing poles to be in contact with each other, adhering the layers of sheet steel together. Conversely, where lines of magnetic flux are caused to pass horizontally through stacked sheet steel, the induced magnetic poles are located at the edges of the sheets of steel. Consistent orientation of such induced magnetic poles causes like poles to be grouped together at the edges of the stack, resulting in magnetic repulsion. Such magnetic repulsion at the edges of the sheet steel stack upwardly fans the stack, separating adhered sheets from each other, and exposing individual edges for convenient grasping. Magnetic mechanisms adapted for accomplishing such magnetic fanning of stacks of sheet steel are known.

One such known magnetic mechanism incorporates an electromagnet which may be conveniently placed in operating proximity with a stack of sheet steel. The electromagnet may be turned on for magnetic fanning of the sheets, and may be conveniently be turned off when no longer needed. However, the coiled windings of such mechanisms are undesirably bulky, and such mechanisms undesirably require an electrical power supply.

Magnetic fanning mechanisms incorporating permanent magnets are similarly known, such mechanisms overcoming some of the undesirable characteristics of electromagnets. However, permanent magnets may not be switched on and off in the manner of electromagnets. Therefore, where a permanent magnet sheet fanner is utilized, its magnet must be forcefully pulled away from the stack of sheets when not in use. Strong magnetic attraction between a magnetic fanner incorporating permanent magnets and sheet metal typically makes it difficult to pull the fanning mechanism away from sheet metal when not in use.

The instant invention ameliorates or lessens the difficulty of pulling such magnets away from stacked sheet steel by providing structures adapted for rotating or pivoting a permanent magnet assembly away from the stacked sheet steel rather than directly forcing or driving the magnet linearly away from the sheet steel stack. By providing structure for pivoting the magnets toward and away from the stacked sheet steel the inventive sheet fanner incorporates a novel, inventive and useful "on-off" function.

BRIEF SUMMARY OF THE INVENTION

The instant inventive magnetic sheet fanner comprises four core structural elements: a housing or support frame, a permanent magnet assembly, pivotal or rotatable mounting means, and turning means; the housing supporting each of the other three structural elements.

The housing primarily functions as a support frame member. Ideally, the housing forms an occlusive closure, protecting supported structures from dirt and debris. Suitably though less desirably, the housing may be configured as an open frame. Preferably, the housing has a sheet contact side configured as a vertically elongated bearing face. The vertical length of the bearing face typically is equal to or greater than the maximum height of sheet metal stacks to be fanned by the magnetic sheet fanner. For example, where the magnetic sheet fanner is to be utilized for fanning sheet metal stacked ten inches high, the vertical dimension of the bearing face should be at least twelve inches. Suitably, such vertical length may be less than such maximum height where means are provided for alternately upwardly and downwardly positioning the magnetic sheet fanner with respect to stacked sheet steel.

The vertically elongated bearing face of the housing comprises the structure through which magnetic flux emanates for fanning a stack of sheet steel. It is preferable for the bearing face to be composed of non-magnetic steel so that the thickness of the face provides an "air gap" between the sheet stack and the magnet; such gap lessening the force needed to pivot the magnet away from the sheet stack. Where magnetic flux from opposing poles emanates through the bearing face, the non-magnetic character of the bearing face additionally functions to avoid a magnetic armature across the magnetic poles, which may undesirably reduce the strength of the magnetic field available for fanning sheet steel. Where the bearing face comprises magnetic steel, avoidance of such magnetic armature effect may be suitably achieved by configuring such face as vertically oriented strips or plates, which are spaced apart from each other; the space providing an air gap between the strips or plates. Preferably, the outer surface of the vertically elongated bearing face has a plurality of vertically oriented slide ridges for reducing frictional forces between the sheet steel and the magnetic sheet fanner.

The permanent magnet of the instant inventive magnetic sheet fanner is preferably situated within the housing immediately behind the vertically elongated bearing face. Preferably, the poles of the permanent magnet are vertically elongated allowing them to be mounted co-extensively along the inner surface of the bearing face. Where it is desirable to expose the bearing face to magnetic flux from opposing poles, the permanent magnet is preferably configured as a vertically elongated horseshoe magnet. Preferably the axes of magnetization at the poles of such magnet are parallel to each other. Suitably, though less desirably, such axes may be oriented at an angle to each other. A preferred means of constructing such vertically elongated horseshoe magnet incorporates a vertically elongated mild magnetic steel back plate upon which dual rows of block shaped bar magnets are fixedly mounted. The magnets in each row are consistently arranged so that the magnets in one row forwardly expose their south poles, while the magnets in the other row forwardly expose their north poles. Such arrangement allows the mild magnetic steel back plate to serve as an armaturing link between the rearwardly exposed north and south poles of the bar magnets, causing the combination of the bar magnets and the back plate to form the vertically elongated horseshoe magnet.

In a suitable alternate configuration of the permanent magnet, similar block-shaped bar magnets are arranged in a single vertical row along a backing plate, cumulatively forming at least a first vertically elongated bar magnet. The block shaped bar magnets are preferably consistently oriented with their north (or alternately south) poles facing forwardly from the back plate. Where the back plate serves as a mounting surface for a single row of permanent bar magnets, such back plate is preferably composed of a ferrous material such as mild steel to aid in redirecting the rearwardly oriented field toward a stack of sheet steel.

In each permanent magnet configuration described above, the pivotal or rotatable mounting means element allows the permanent magnet to pivotally or rotatably move between first and second positions within the housing, such pivotal motion providing an "on-off" function. While the permanent magnet occupies the first "on" position, magnetic flux emanating from its forwardly facing pole or poles is directed through the vertically elongated bearing face, and into stacked sheet metal, fanning the sheet metal. Upon pivoting or rotating movement of the permanent magnet to its second position, such magnetic flux is redirected away from the sheet metal, effectively "turning off" the magnetic sheet fanner, by greatly reducing magnetic attraction to the stack. Upon such pivoting or rotating movement, the stacked sheets are allowed to return to their original non-fanned condition.

In order to accomplish such pivoting or rotating motion, the pivoting or rotatable mounting means preferably comprises a vertically oriented axle fixedly mounted upon the rearward surface of the back plate, the upper and lower ends of the axle respectively extending upwardly and downwardly from the upper and lower ends of the back plate. Such upward and downward extensions conveniently serve as journals. Alternately, the axle may be non-continuous along the rearward surface of the back plate, so long as the upper and lower journal extensions are rigidly mounted. Also, alternately and suitably, the upper and lower ends of the back plate itself may be milled to form upper and lower journals, allowing the back plate to dually function as a mounting surface and as a pivoting or rotating means. Other pivoting means may be suitably utilized.

In order to facilitate pivotal or rotatable motion of the permanent magnets about such upper and lower journals, upper and lower bearings for receiving said journals are necessarily fixedly mounted within the housing. Preferably, the lower bearing is fixedly mounted upon and supported by a floor of the housing. Also preferably, the upper bearing is fixedly mounted upon a ceiling or upper wall within the housing, such upper wall overlying the permanent magnet. Suitably, the upper and lower bearings may be fixedly mounted upon other structures within the housing such as bearing supporting brackets.

The orientations of the upper and lower journals and the upper and lower bearings preferably vary in accordance with the configuration of the permanent magnet. Where the permanent magnet is configured as a vertically elongated horseshoe, it is preferable to orient the journals and bearings within the housing to allow the permanent magnet to swing in the manner of a door along a 90° arc. Such motion is preferably accomplished by plate and by similarly laterally offsetting the bearings with respect to the midline of the vertically elongated bearing face.

Where the permanent magnet is configured as a vertically elongated bar magnet, the journals are preferably located rearward of the midline of the vertically elongated north or south pole, allowing such pole to rotate in a circular path about the journals. In such configuration, the upper and lower bearings are preferably centrally located within the housing. In such configuration, the proximity of the upper and lower bearings with respect to the bearing face is preferably closely fitted to minimize the distance between the forward facing pole of the permanent magnet and the inner surface of the bearing face while such magnet is in its first "on" position, while leaving such magnet free to swing in an arc across the interior of such surface. In such configuration, upon rotation of the permanent magnet 180° away from its first "on" position, the pole face in closest proximity to the bearing face is rotatably moved rearwardly within the housing. Preferably, the position of the magnet and backing plate in relation to the journals is adjusted to achieve a sufficient reduction in magnetic flux emanating through the bearing face upon a 180° rotation, and to achieve acceptable compactness of the housing.

The housing walls other than the bearing face preferably comprise mild magnetic steel. Utilization of mild magnet steel for the housing functions to act as an armaturing link between the north and south poles of the bar or horseshoe magnet upon positioning in their off positions. By acting as an armaturing link in the off position, the mild magnetic steel walls reduce magnetic flux which emanates from the sheet fanner while not in use.

The turning means element of the inventive magnetic sheet fanner comprises some suitable structure adapted to apply torque to the permanent magnet assembly, rotating or pivoting the assembly away from its first "on" position. In a preferred torquing or turning means configuration, an upper end of the upper journal is exposed through the upper bearing, providing a convenient point for application of torque to the journal. Application of torque to such journal utilizes the journal as a drive axle. Any one of numerous means of applying torque to such exposed journal end may be suitably utilized. For example, a manually operated turn wheel may be axially mounted upon said journal end. Similarly, a crank handle may be mounted upon said journal end. Also suitably, the power output shaft of an hydraulic motor or electric servo-motor may be directly linked to said journal end. Suitably, the lower end of the lower journal may be exposed, allowing similar torque applicating means to be applied to the lower journal.

Suitably, though less desirably, the torque applying means may be directed to some other portion of the permanent magnet, backing plate, axle and journal assembly, rotating the permanent magnets about the journals, without utilizing either of the journals as a drive axle.

A preferred means of applying torque to the preferred exposed upper journal is to fixedly mount a lever arm upon said journal, and to articulate such lever arm through the action of a telescoping shaft of a pneumatic cylinder. In such preferred assembly, the base of the pneumatic cylinder is preferably fixedly and pivotally mounted within a laterally extending upper chamber of the housing. The telescoping shaft of such cylinder is preferably pivotally mounted upon the distal end of the lever arm causing the piston, telescoping shaft, and lever arm combination form a conventional piston and crankshaft assembly. Suitably, a hydraulic cylinder may be utilized in place of the pneumatic cylinder. Also suitably, various motor operated or manually operated jack screws may be utilized.

An alternate preferred means of applying torque to the preferred exposed upper journal end incorporates a first drive pulley or sprocket fixedly mounted upon said journal end. Such first drive pulley or sprocket is preferably rotatably driven by a drive belt or chain, such belt or chain preferably being driven by a second drive pulley or sprocket of a pneumatic rotary actuator.

Preferably, the housing encases the permanent magnet, the pivotal or rotatable mounting means, and encases the turning means, the housing forming a substantially occlusive closure preventing dirt and debris from fowling internal mechanisms. Also preferably, an external surface of the housing is configured as a mounting plate for mounting the sheet fanner upon a sheet metal storage table or upon a mobile rollable cart.

Accordingly, it is an object of the present invention to provide a magnetic sheet fanner incorporating means for pivotal or rotatable mounting of a permanent magnet within a housing, such means providing an "on-off" function.

It is a further object of the present invention to provide such a sheet fanner incorporating turning means for pivoting or rotating the permanent magnet within the housing.

Other and further objects, benefits, and advantages of the present invention will become known to those skilled in the art upon review of the Detailed Description which follows, and upon review of the appended drawings.

DETAILED DESCRIPTION OF PREFERRED EMBODIMENTS

Figure 1:
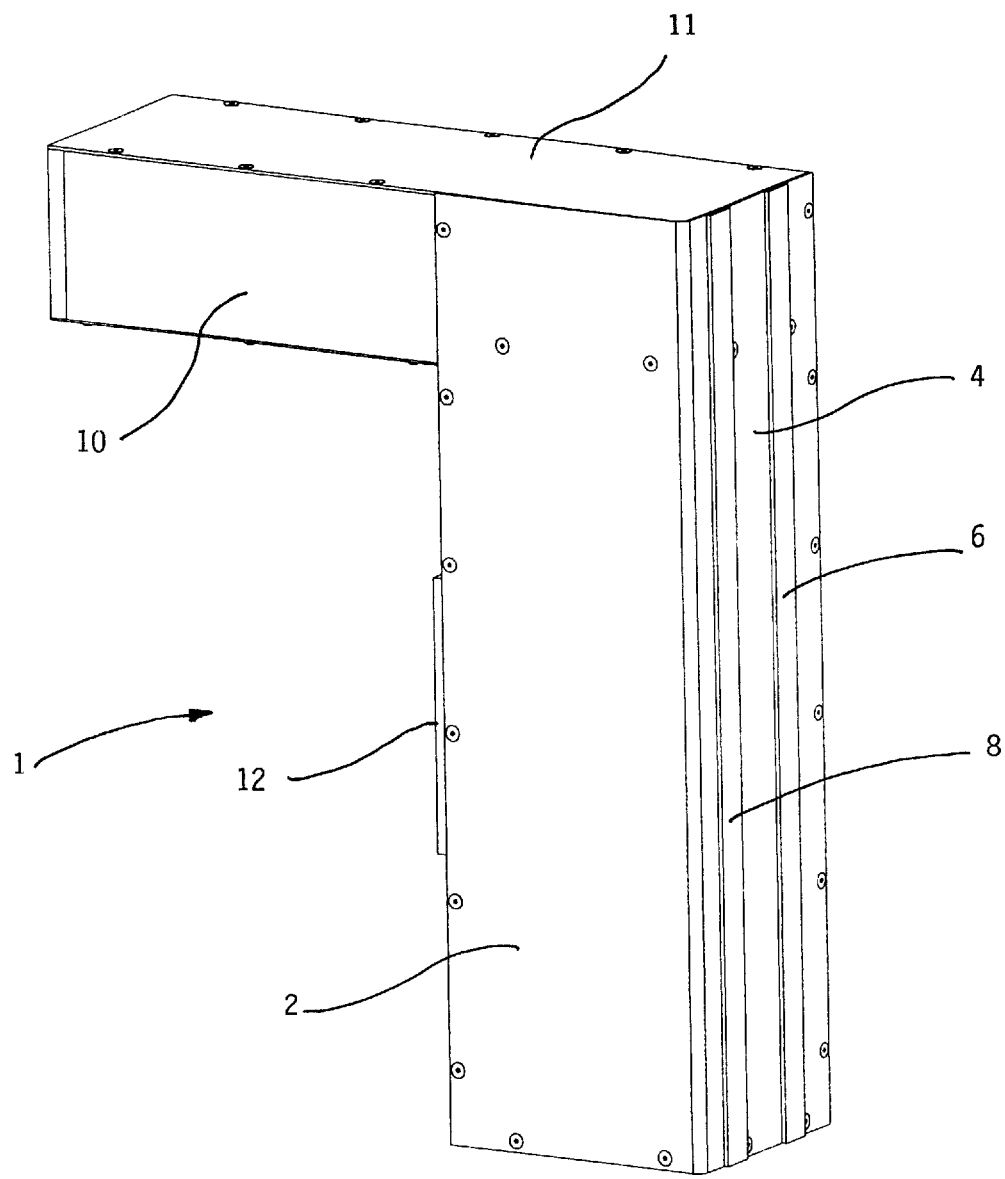
FIG. 1 is an exterior isometric view of a preferred embodiment of the instant inventive magnetic sheet fanner.
Figure 2:
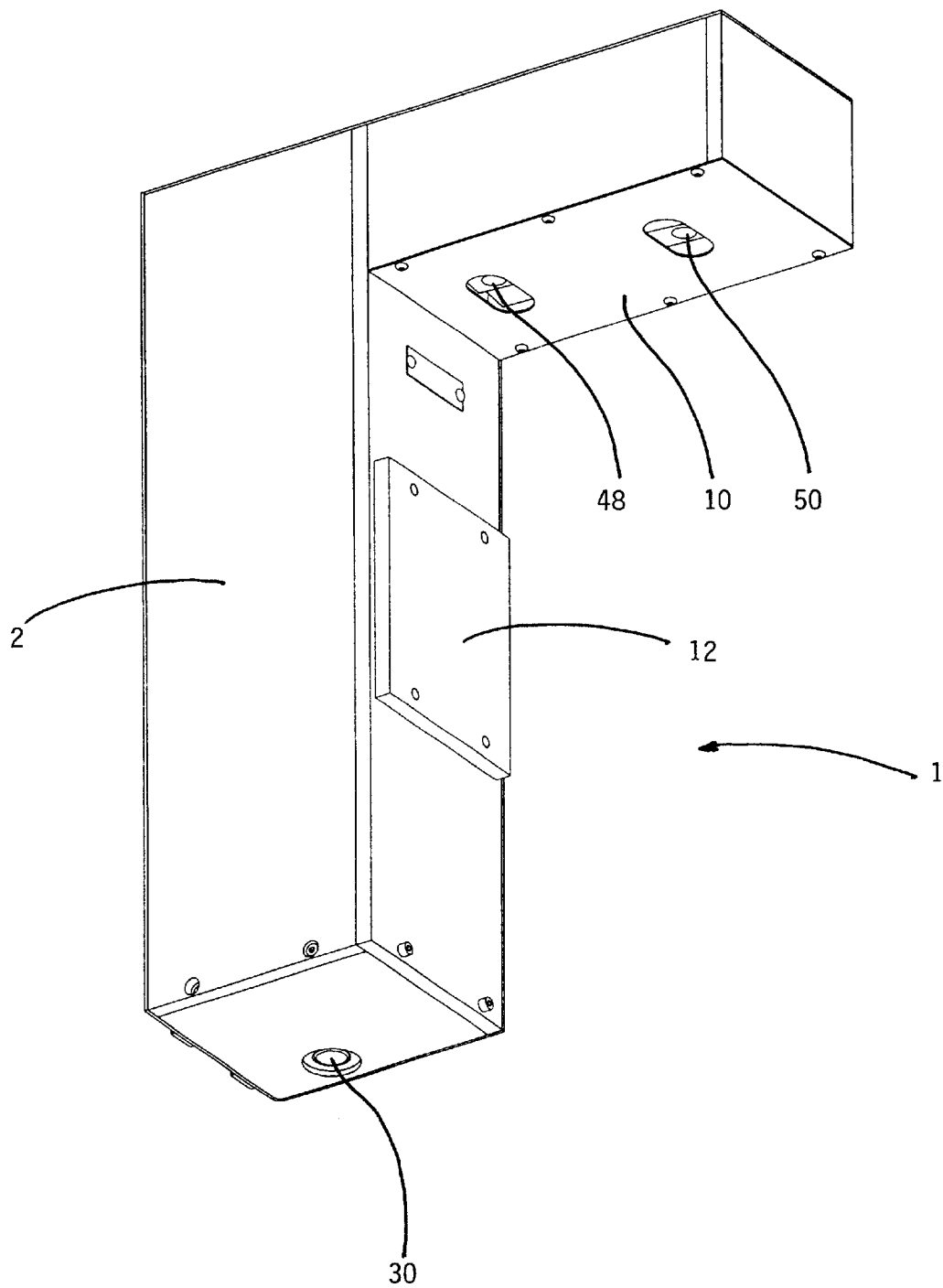
FIG. 2 is an opposite isometric view of the magnetic sheet fanner depicted in FIG. 1.

Referring now to the drawings, and in particular to FIG. 1, the instant inventive magnetic sheet fanner is referred to generally by reference arrow 1. The magnetic sheet fanner 1 has a removable magnet housing 2 incorporating a sheet contact or bearing face 4, the sheet contact face 4 having vertically extending friction reducing ridges 6 and 8. An actuator assembly housing 10 having a cover 11 extends laterally from the upper end of the magnetic sheet fanner 1. Referring simultaneously to FIGS. 1 and 2, the magnetic sheet fanner 1 has a mounting plate 12.

Figure 3:
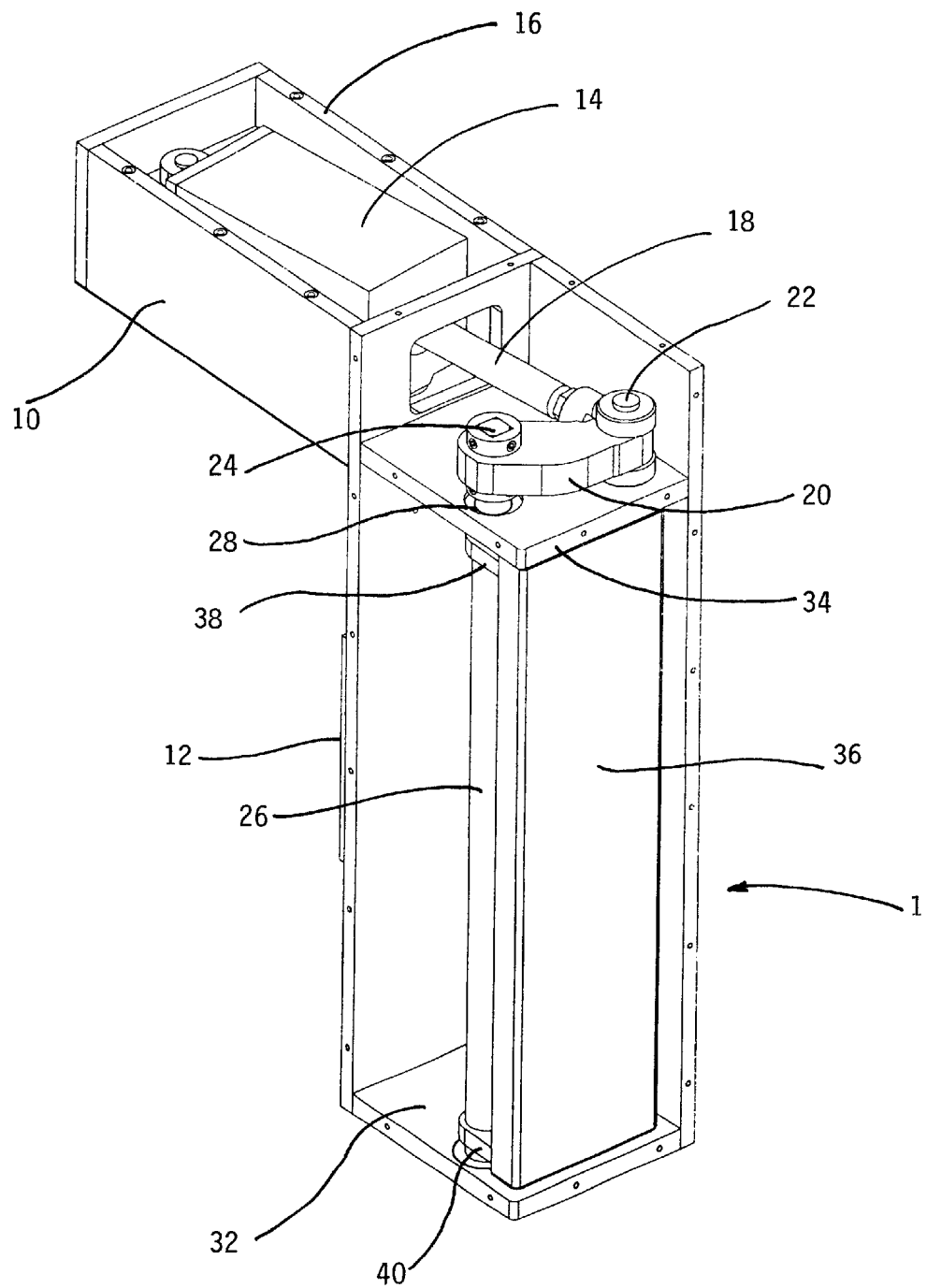
FIG. 3 is an isometric view of the magnetic sheet fanner depicted in FIG. 1, showing cover removed, and magnet oriented in an "on" position.

Referring to FIG. 3, showing housing covers 2 and 11 removed, the actuator housing 10 encloses a pneumatic cylinder 14, such cylinder having a rearward pivotal mount 16. An alternately extendable and retractable piston rod 18 of the pneumatic cylinder 14 is pivotally mounted upon the distal end of lever arm 20 by means of eye and device joint 22. The proximal end of lever arm 20 is fixedly mounted upon an upper end 24 of axle 26, such axle 26 having upper and lower journals carried respectively by an upper bearing 28 and, referring to FIG. 2, a lower bearing 30. Referring simultaneously to FIGS. 2 and 3, lower bearing 30 is fixedly mounted within floor 32, while upper bearing 28 is fixedly mounted within upper wall 34. A permanent magnet assembly 36 is fixedly mounted upon axle 26 by means of upper and lower mounting brackets 38 and 40.

Figure 8:
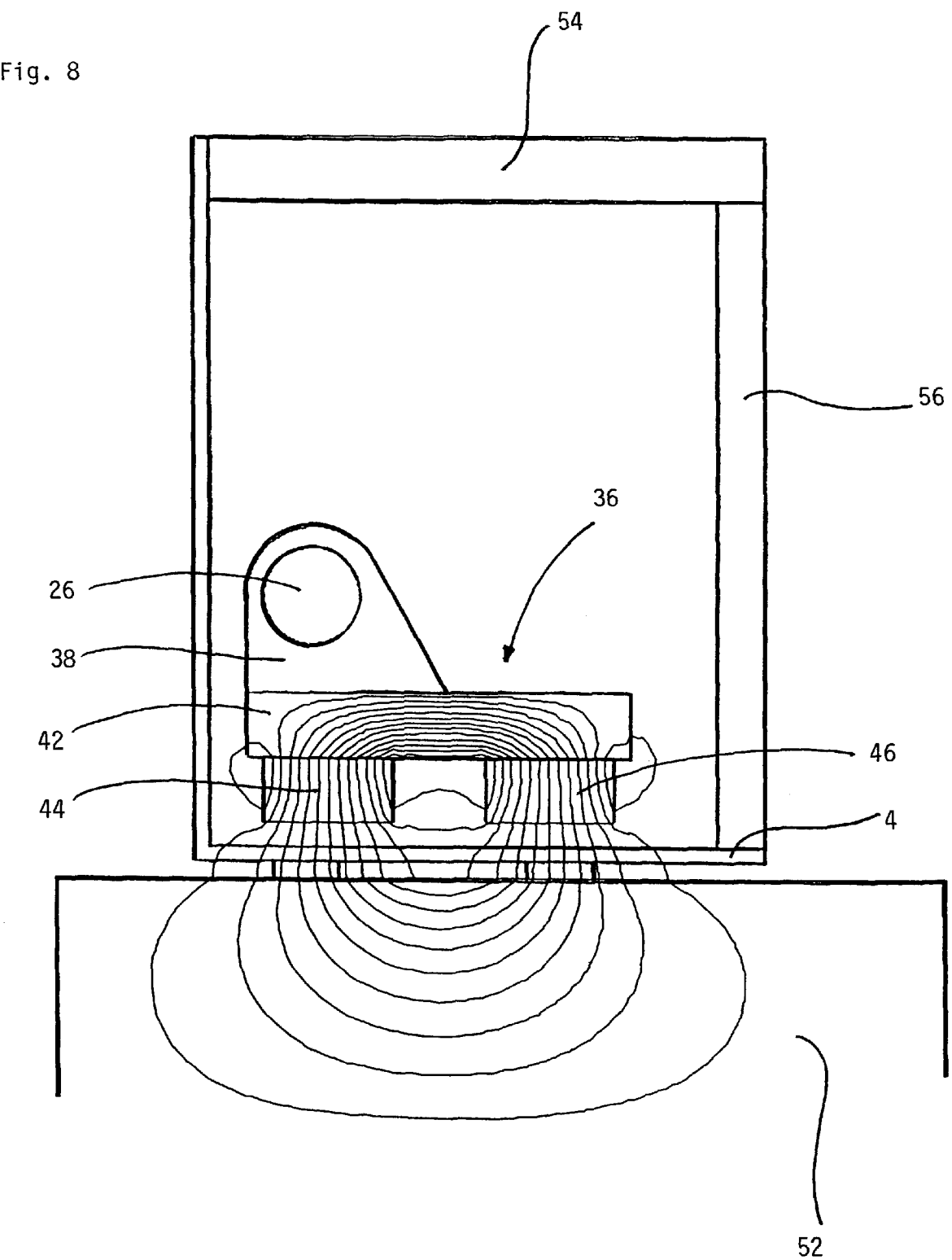
FIG. 8 is a representational magnetic flux diagram corresponding with the "on" magnet orientation of FIG. 3.

Referring simultaneously to FIGS. 3 and 8, permanent magnet assembly 36 preferably comprises a ferrous or magnetic back plate 42, such back plate 42 having vertically extending permanent magnets 44 and 46 fixedly mounted thereon, the permanent magnets 44 and 46 in combination with the back plate 42 forming a vertically extending elongated horseshoe magnet 36.

Referring simultaneously to FIGS. 2 and 3, the pneumatic cylinder 14 is operated via air outlets 48 and 50. Referring to FIG. 3, upon actuation of the pneumatic cylinder 14 to extend piston rod 18, magnet assembly 36 is pivoted to a first "on" position wherein magnetic flux is directed through, referring to FIG. 1, the sheet contact side 4 of housing 2. Referring simultaneously to FIGS. 1, 3, and 8, it is preferable that the sheet contact side 4 of housing 2 comprise non-magnetic stainless steel in order to prevent such side from acting as an armaturing bypass which may undesirably reduce transmission of magnetic flux.

Figure 4:
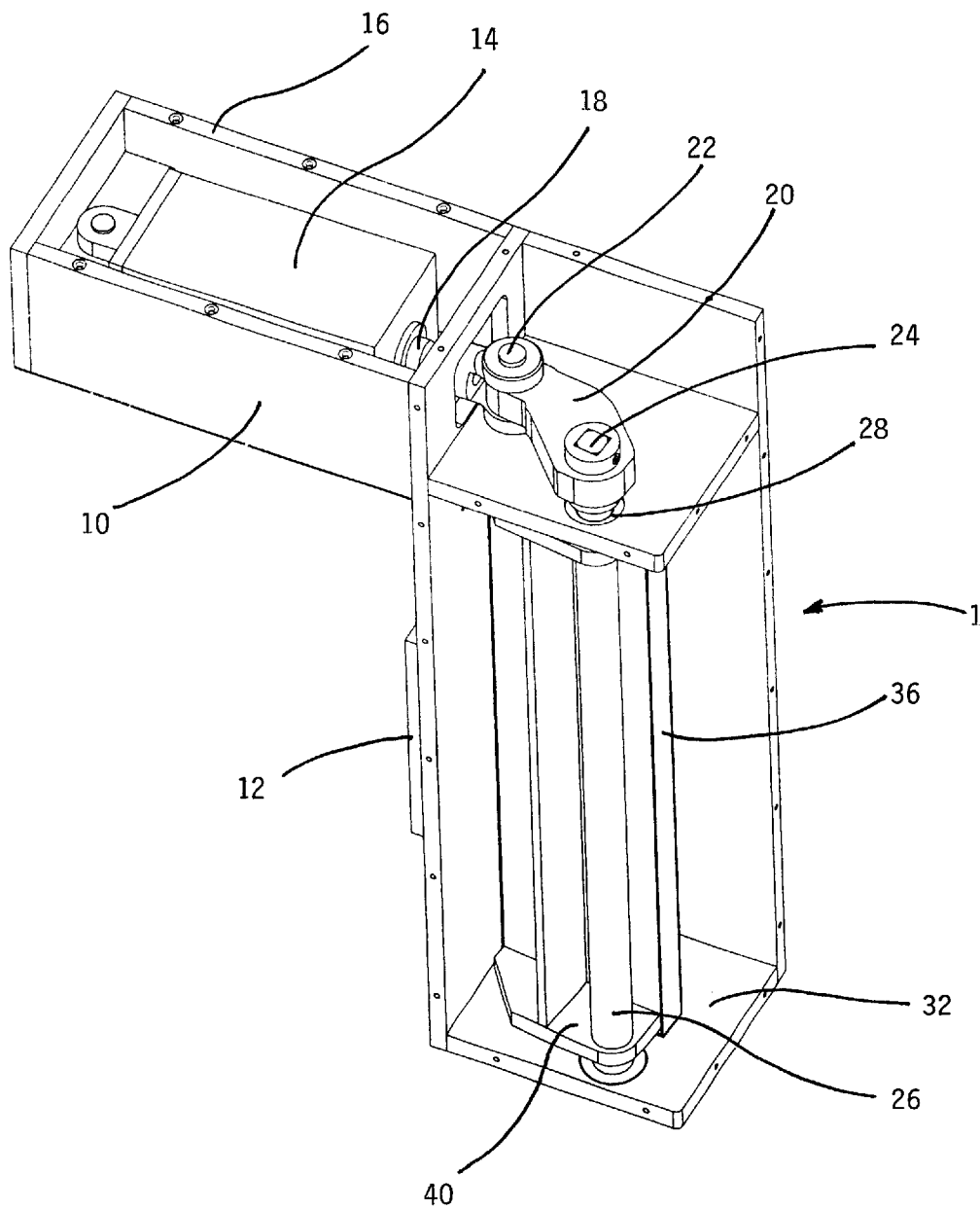
FIG. 4 is an isometric view of the magnetic sheet fanner depicted in FIG. 3, showing magnet oriented in an "off" position.
Figure 9:
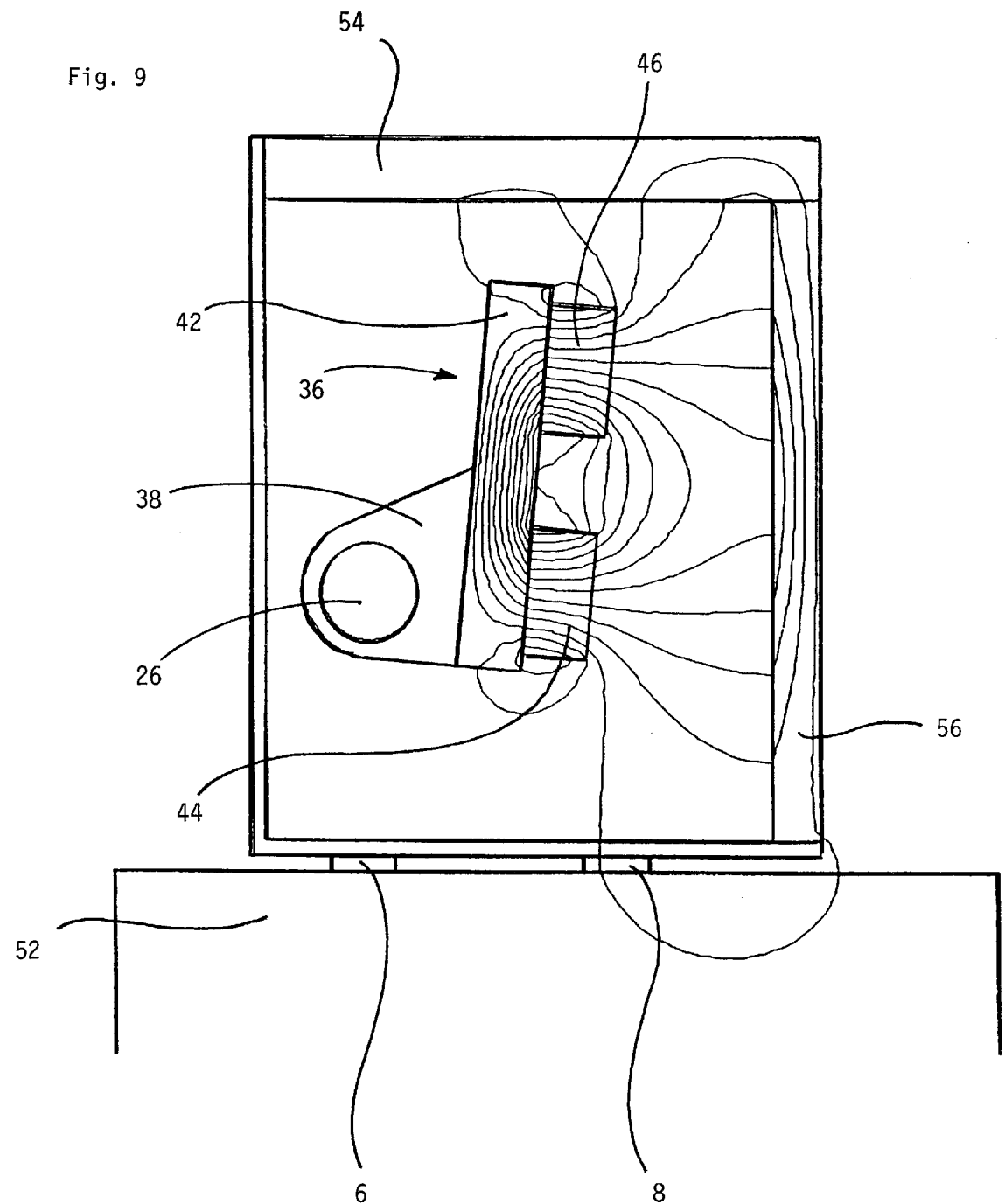
FIG. 9 is a representational magnetic flux diagram corresponding with the "off" magnet orientation of FIG. 4.

Referring to FIG. 4, upon operation of the pneumatic cylinder 14 to retract piston rod 18, the magnetic assembly 36 is pivotally moved counter-clockwise approximately 90° to a second "off" position as is representationally depicted in FIG. 9.

Referring simultaneously to FIGS. 8 and 9, upon pivotal motion of magnet assembly to the first "on" position depicted in FIG. 8, magnetic flux emanating from the north pole 44 and entering the south pole 46 effectively fans sheet steel stack 52 enabling convenient grasping, separation and handling of the sheet steel. Upon pivotal motion of the magnetic assembly to the second "off" depicted in FIG. 9, the magnetic flux is directed away from sheet steel stack 52. Referring to FIG. 9, it is preferable that side wall 56 and rear wall 54 of the housing be composed of a ferrous material such as magnetic steel so that it may serve as an armaturing link between north and south poles 44 and 46, reducing emanation of magnetic flux from such side walls.

Figure 5:
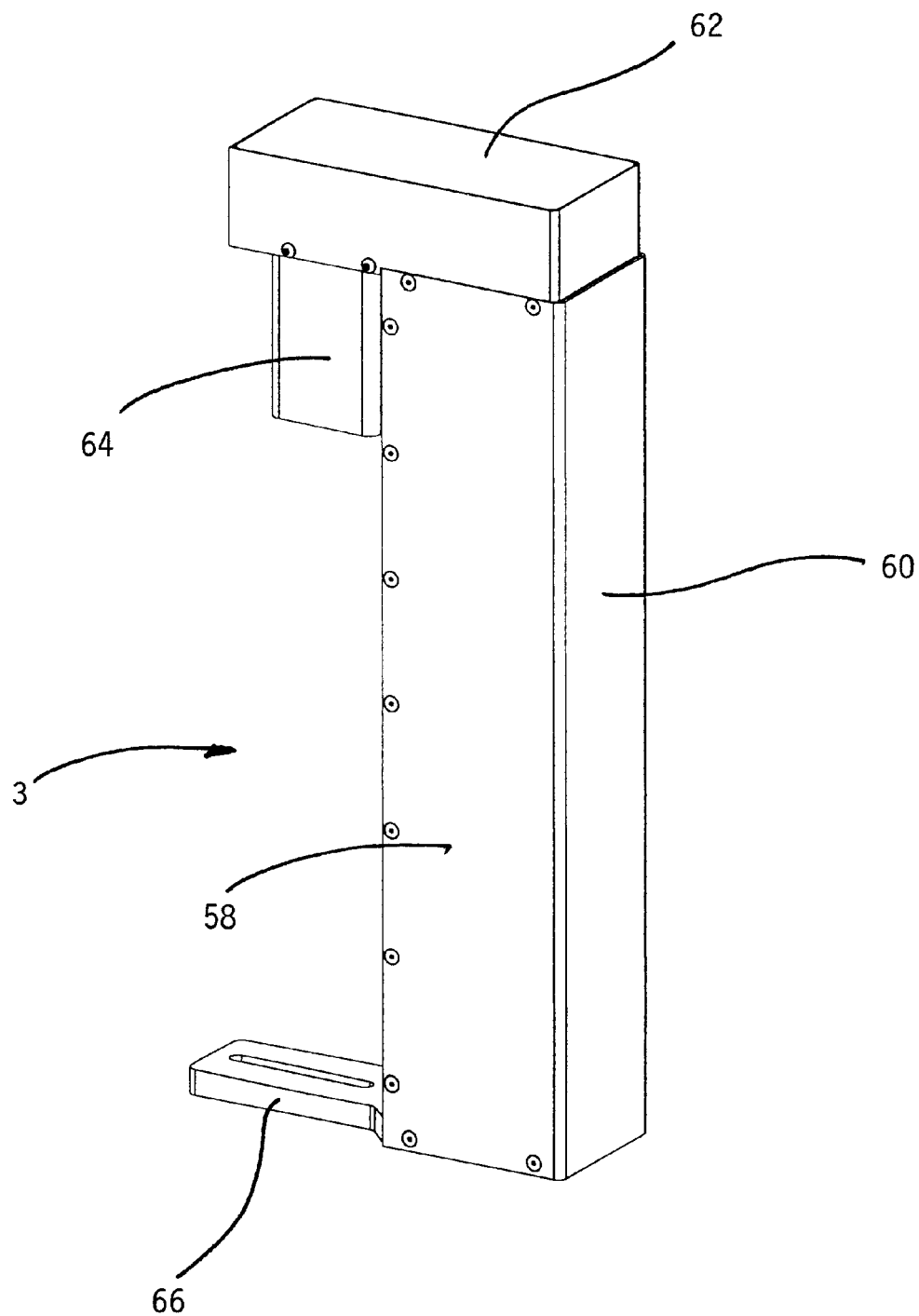
FIG. 5 is an isometric view of an alternate configuration of the present inventive magnetic sheet fanner.

Referring to FIG. 5, reference arrow 3, denotes an alternate configuration of the present inventive magnetic sheet fanner. Sheet fanner 3 has a magnet housing 58, the magnet housing having a sheet contact side 60, an upper pulley wheel housing 62, a pneumatic rotary actuator 64, and a lower mounting plate 66.

Figure 6:
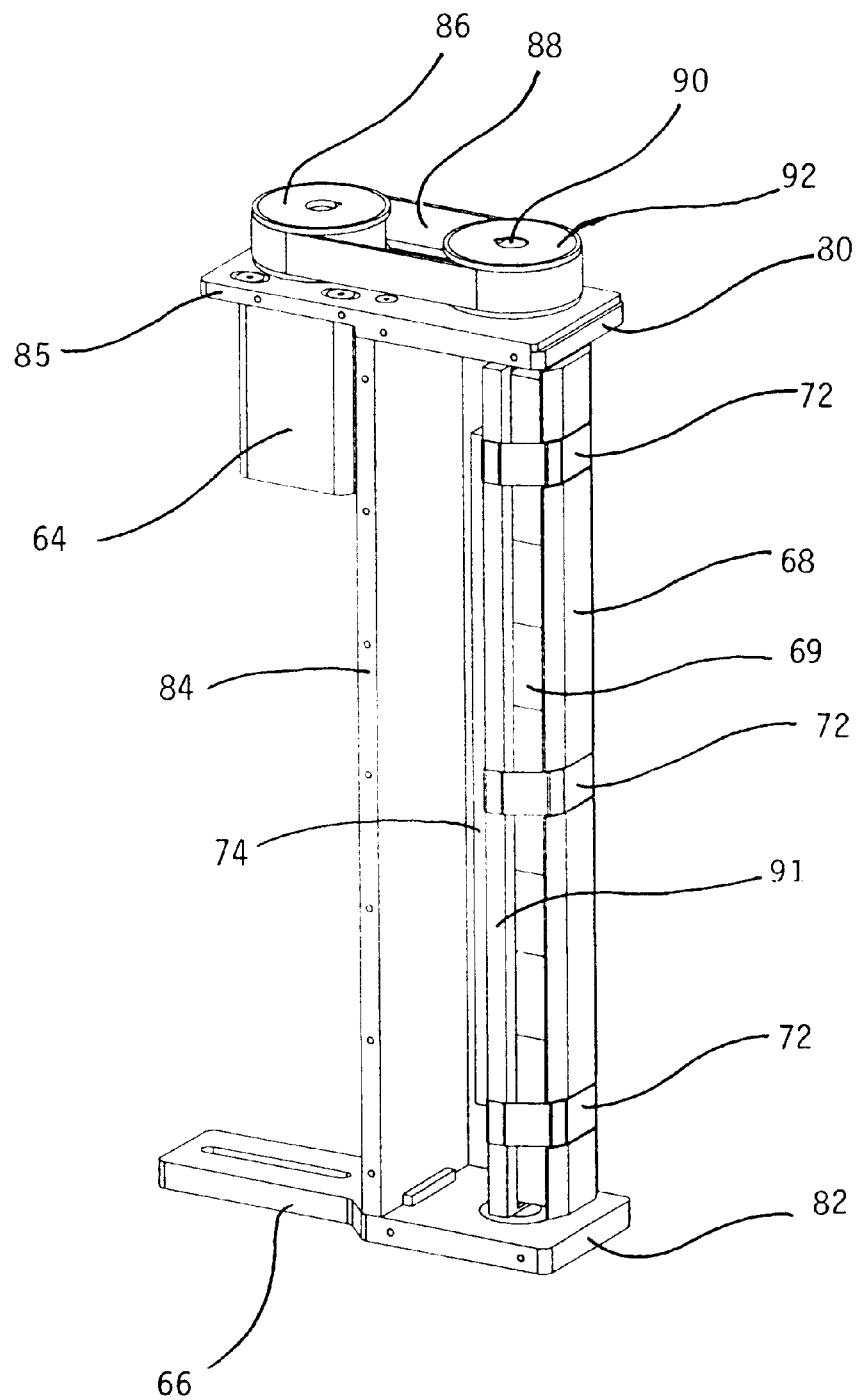
FIG. 6 is a view of the mechanism of FIG. 5, with cover removed and magnet in "on" position.
Figure 7:
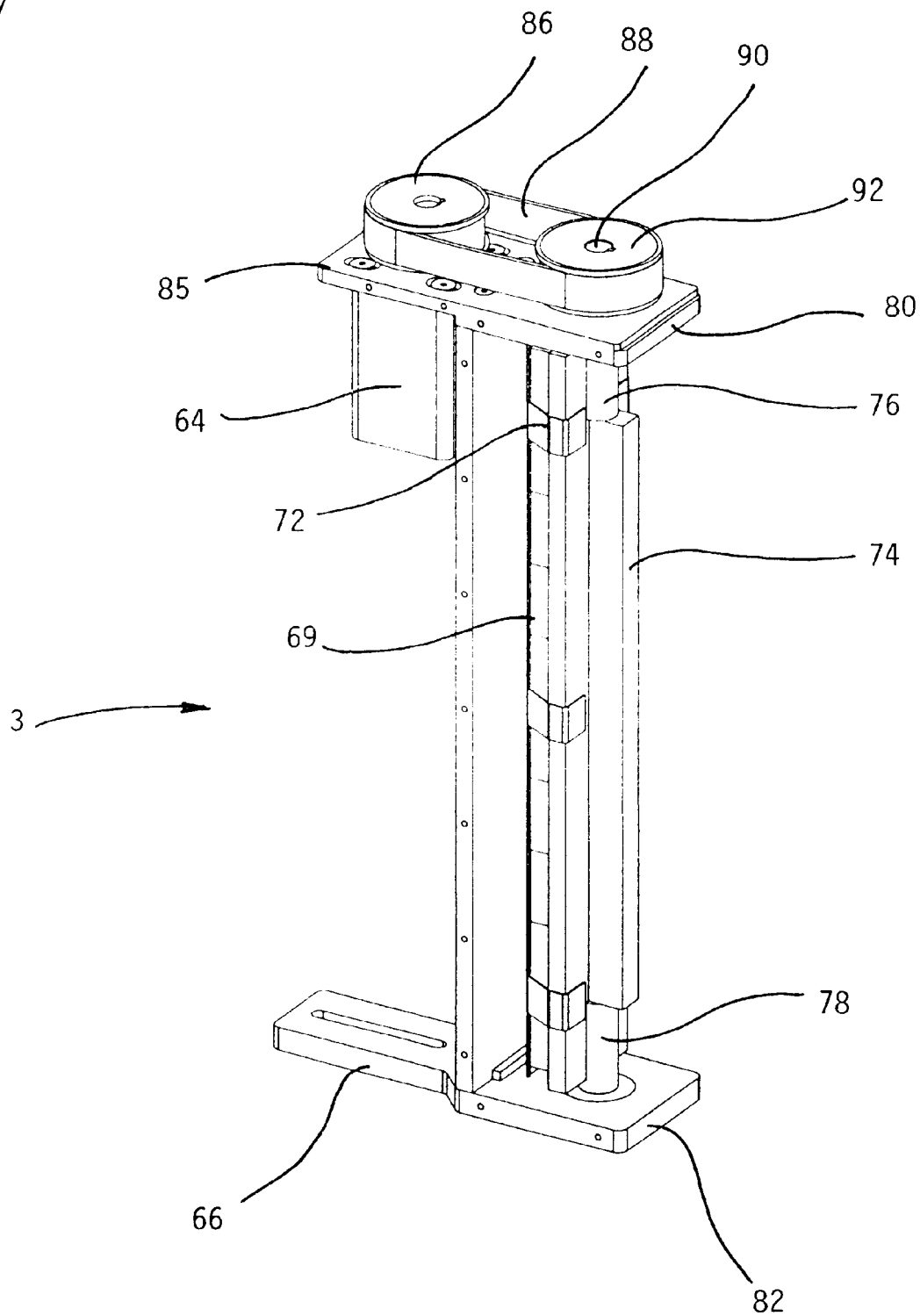
FIG. 7 is the mechanism as depicted in FIG. 6, showing magnet rotated to an "off" position.

Referring simultaneously to FIGS. 6 and 7, a vertically elongated bar magnet 69 is fixedly mounted upon back plate 91 by means of mounting straps 72. Referring to FIG. 7 showing magnet 69 and back plate 91 rotated away from the orientation depicted in FIG. 6 by 180°, back plate 91 is fixedly mounted upon axles 76 and 78. Such axles may be combined into a continuous shaft, dually serving as a backing plate stiffener. Alternately, the axles may be separate as shown with a stiffening element 74, as necessary. Upper and lower journals 76 and 78 are rotatably mounted within bearings (not depicted) mounted within upper wall 80 and lower wall 82. Upper wall 80 and lower wall 82 are rigidly attached to vertical frame member 84, such structural elements 80, 82, and 84 in combination forming the rigid internal frame structure of the magnetic sheet fanner 3.

Referring again to FIG. 6, the pneumatic rotary actuator 64 is fixedly mounted upon the lower surface of a rearward extension 85 of upper wall 80. The drive shaft (not depicted) of the pneumatic rotary actuator 64 extends upwardly through rearward extension 85, and a belt driving pulley 86 is fixedly mounted thereon. Pulley 86 actuates drive belt 88 for turning a second magnet turning pulley 90; the magnet turning pulley 90 being fixedly mounted upon the upper end 92 of axle 76.

Referring simultaneously to FIGS. 6 and 7, selective actuation of the pneumatic rotary actuator 64 rotates magnet 69 between its first "on" position depicted in FIG. 6 to its second "off" position depicted in FIG. 7.

Figure 10:
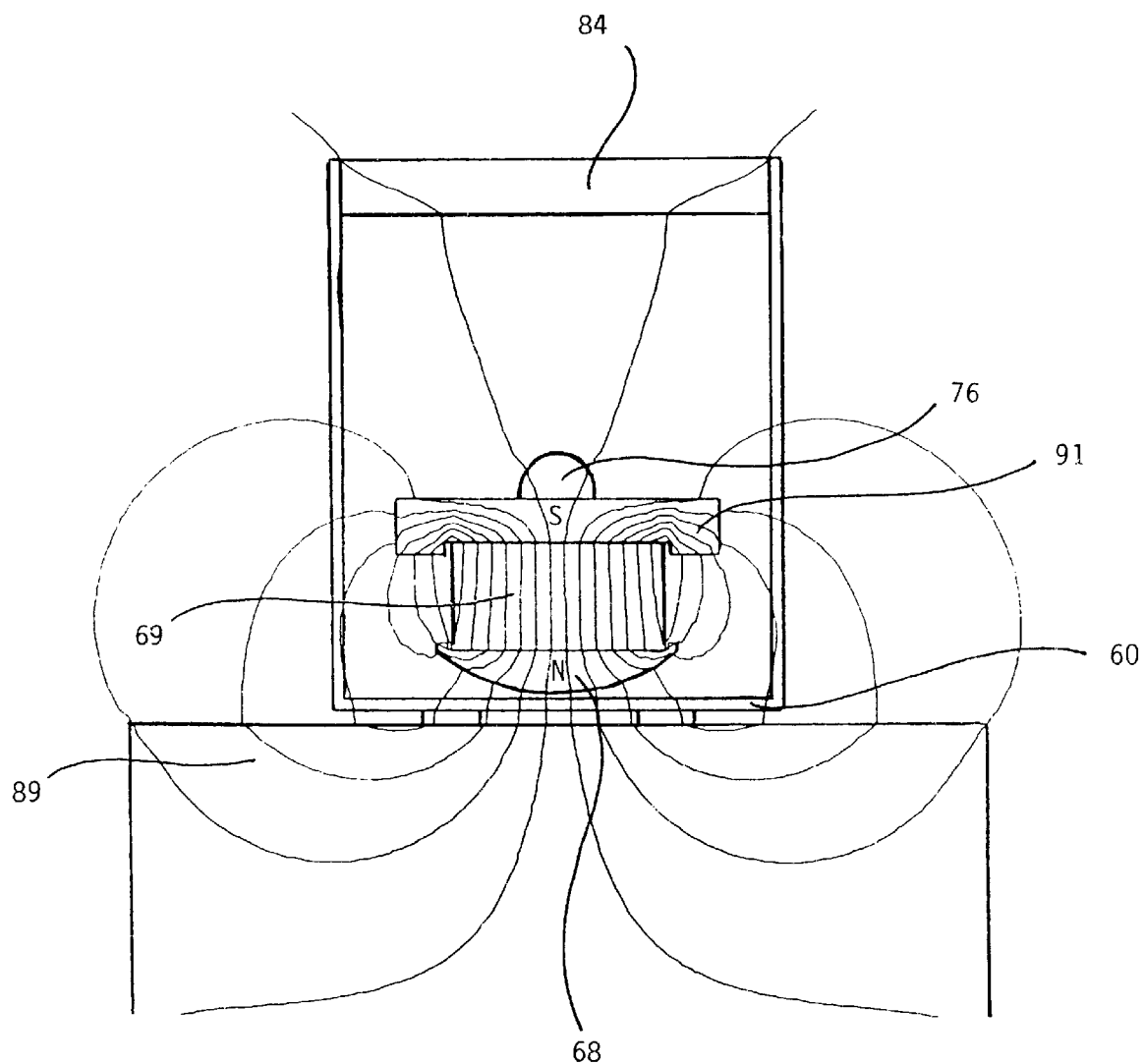
FIG. 10 is a representational magnetic flux diagram corresponding with the "on" magnet orientation of FIG. 6.

Referring to FIG. 10, when the magnet 69 is rotated about axle 76 to its forwardly facing "on" position, magnetic lines of flux pass through the sheet contact side 60 of the housing to enter sheet metal stack 89, effectively fanning and separating individual sheets of the stack for handling.

Figure 11:
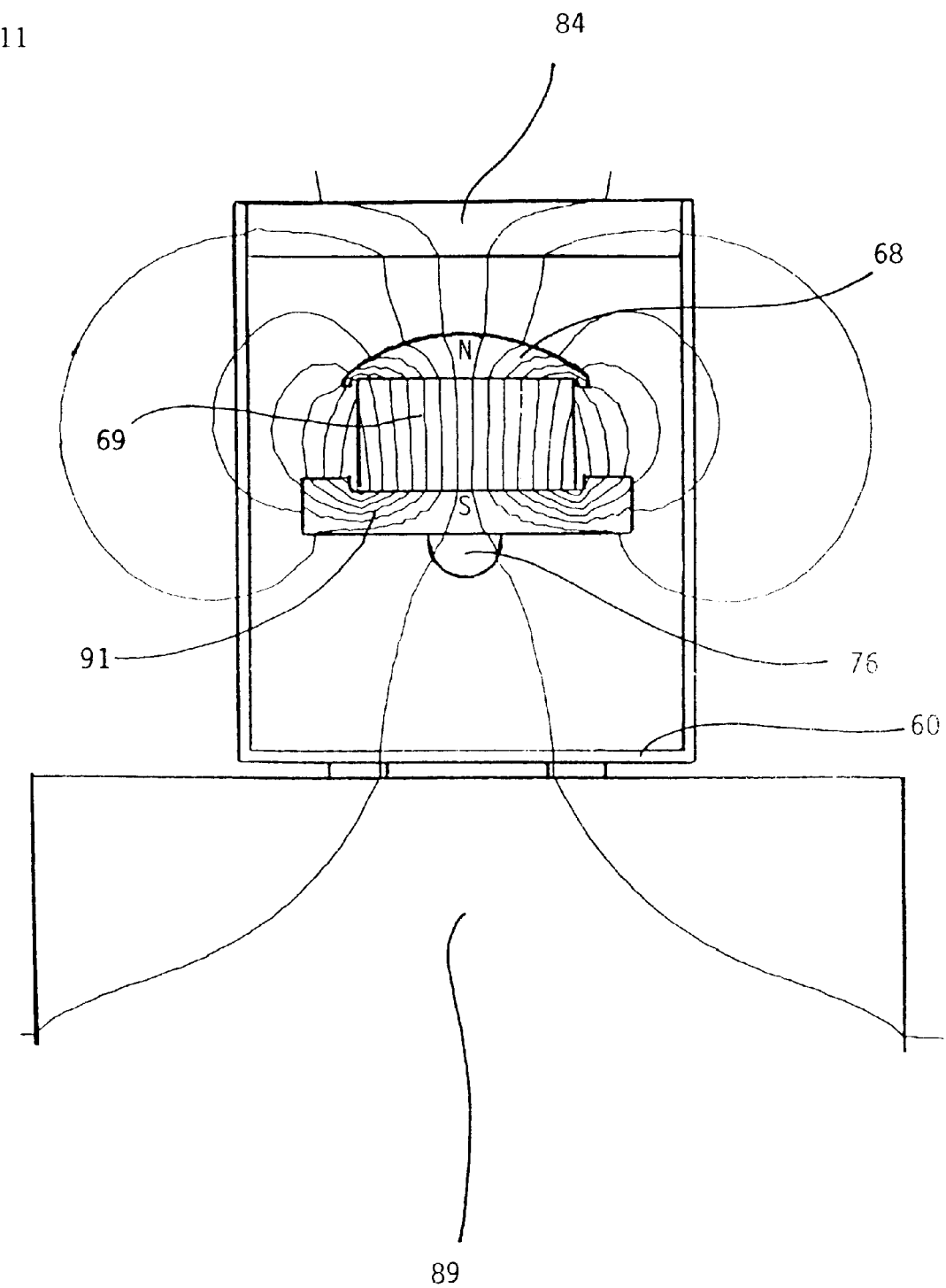
FIG. 11 is a representational magnetic flux diagram corresponding with the "off" magnet orientation of FIG. 7.

Suitably, said sheet contact side of the magnetic assembly in its "on" position may comprise magnetic steel, serving as a pole extension 68 and effectively moving the working face of magnet 69 closer to sheet metal stack 89. Referring to FIG. 11, upon rotation of the magnet 69 180°, the magnetic flux is directed away from sheet metal stack 89, directing the magnetic flux away from sheet metal stack 89, and allowing such stack to return to its normal position. Referring simultaneously to FIGS. 6 and 11, it is preferable that vertical frame member 84 be composed of magnetic steel so that it may serve as a armaturing or shunting link between the back plate 91 and pole extension 68, thereby reducing stray magnetic fields emanating toward the sheet contact face 60.

While the principles of the invention have been made clear in the above illustrative embodiments, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:
1. A magnetic sheet fanner comprising:
   (a) an elongated horseshoe magnet having a north pole, a south pole, an upper end, and a lower end, the north and south poles of the elongated horseshoe magnet extending from the upper end to the lower end;
   (b) a magnet support frame defining an interior space and having a sheet contact side;
   (c) pivotal mounting means interlinking the elongated horseshoe magnet and the support frame so that the elongated horseshoe magnet may pivotally move between a first position and a second position within the interior space, the elongated horseshoe magnet directing a magnetic field through the sheet contact side of the support frame while the elongated horseshoe magnet is in its first position, the elongated horseshoe magnet directing the magnetic field away from the sheet contact side upon pivotal motion to its second position; and,
   (d) turning means adapted for selectively pivoting the elongated horseshoe magnet between its first and second positions.

2. The magnetic sheet fanner of claim 1 wherein the elongated horseshoe magnet comprises a first series and a second series of permanent magnets, and an elongated magnetic steel plate, the poles of the first series of permanent magnets and the poles of the second series of permanent magnets respectively contacting the elongated magnetic steel plate so that their opposite poles cumulatively form the north and south poles of the elongated horseshoe magnet.

3. The magnetic sheet fanner of claim 1 wherein the pivotal mounting means comprises an axle and at least a first bearing.

4. The magnetic sheet fanner of claim 3 wherein the axle is a drive axle, and wherein the turning means comprises a pneumatic cylinder having a piston rod and a lever having a first end and a second end, the first end of the lever being fixedly attached to the drive axle, the second end of the lever being pivotally attached to the piston rod.

5. The magnetic sheet fanner of claim 3 wherein the axle is a drive axle, and wherein the turning means comprises a pneumatic rotary actuator operatively connected to the drive axle.

6. The magnetic sheet fanner of claim 5 wherein the operative connection between the pneumatic rotary actuator and the drive axle comprises first and second pulleys or sprockets and a drive belt or drive chain, the first and second pulleys or sprockets being respectively fixedly mounted upon the drive axle and upon the pneumatic rotary actuator, the drive belt or drive chain interlinking the first and second pulleys or sprockets.

7. The magnetic sheet fanner of claim 3 wherein the turning means comprises a mechanism selected from the group of manually operable levers, manually operable turn wheels, pneumatic cylinder and lever assemblies, pneumatic rotary actuators, hydraulic cylinder and lever assemblies, hydraulic motors, jack screws, and electric motors.

8. The magnetic sheet fanner of claim 1 wherein the sheet contact side of the support frame comprises a magnetically transparent material.

9. The magnetic sheet fanner of claim 8 wherein the magnetically transparent material of the sheet contact side of the support frame comprises stainless steel or an air gap disposed between strips of magnetic steel.

10. The magnetic sheet fanner of claim 9 wherein the support frame comprises side walls.

11. The magnetic sheet fanner of claim 1 further comprising a magnetic flux armature fixedly positioned so that upon pivotal motion of the elongated horseshoe magnet to its second position, magnetic flux emanating from said magnet's north pole is closely routed to said magnet's south pole.

12. A magnetic sheet fanner comprising:
   (a) an elongated bar magnet having an upper end, a lower end, an elongated north pole extending from the upper end to the lower end, and an elongated south pole extending from the upper end to the lower end;
   (b) a support frame having an interior space and a sheet contact side;
   (c) rotatable mounting means interlinking the elongated bar magnet and the support frame so that the elongated bar magnet may rotatably move between first and second orientations within the interior space, the elongated bar magnet directing a magnetic field through the sheet contact side of the housing for sheet fanning while the elongated bar magnet is in its first orientation, the elongated bar magnet directing the magnetic field away from the sheet contact side upon rotation of the elongated bar magnet to its second orientation; and, (d) turning means adapted for selectively rotating the elongated bar magnet between its first and second orientations.

13. The magnetic sheet fanner of claim 12 wherein the elongated bar magnet comprises a series of permanent magnets, fixedly attached to an elongated plate, the poles of the permanent magnets being oriented so that they cumulatively form the elongated north and south poles of the elongated bar magnet.

14. The magnetic sheet fanner of claim 13 wherein the rotatable mounting means comprises an axle and at least a first bearing.

15. The magnetic sheet fanner of claim 14 wherein the axle is a drive axle, and wherein the turning means comprises a pneumatic cylinder having a piston rod and a lever having a first end and a second end, the first end of the lever being fixedly attached to the drive axle, the second end of the lever being pivotally attached to the piston rod.

16. The magnetic sheet fanner of claim 14 wherein the axle is a drive axle, and wherein the turning means comprises a pneumatic rotary actuator operatively connected to the drive axle.

17. The magnetic sheet fanner of claim 16 wherein the operative connection between the pneumatic rotary actuator and the drive axle comprises first and second pulleys or sprockets, and a drive belt or drive chain, the first and second pulleys or sprockets being respectively fixedly mounting upon the drive axle, and the pneumatic rotary actuator, the drive belt or drive chain interlinking the first and second pulleys or sprockets.

18. The magnetic sheet fanner of claim 14 wherein the turning means comprises a mechanism selected from the group of manually operable levers, manually operable turn wheels, pneumatic cylinder and lever assemblies, pneumatic rotary actuators, hydraulic cylinder and lever assemblies, hydraulic motors, jack screws, and electric motors.

19. The magnetic sheet fanner of claim 12 further comprising a magnetic flux armature fixedly positioned so that upon pivotal motion of the elongated bar magnet to its second position, magnetic flux emanating from said magnet's north pole is closely routed to said magnet's south pole.

20. The magnetic sheet fanner of claim 19 wherein the support frame comprises side walls.

* * * * *